(12) United States Patent
Calabrese

(10) Patent No.: US 7,929,992 B2
(45) Date of Patent: Apr. 19, 2011

(54) SYSTEM FOR TRANSMITTING TWO-WAY RADIO COMMUNICATIONS VIA COMPUTER NETWORKS

(75) Inventor: Stephen Calabrese, Coral Springs, FL (US)

(73) Assignee: Critical RF, Inc, Jeffersonville, IN (US)

( * ) Notice: Subject to any disclaimer, the term of this patent is extended or adjusted under 35 U.S.C. 154(b) by 895 days.

(21) Appl. No.: 11/797,881

(22) Filed: May 8, 2007

(65) Prior Publication Data

US 2007/0287499 A1    Dec. 13, 2007

Related U.S. Application Data

(60) Provisional application No. 60/746,749, filed on May 8, 2006.

(51) Int. Cl.
*H04Q 1/38* (2006.01)
(52) U.S. Cl. .................................. 455/557; 455/456.1
(58) Field of Classification Search .................. 455/557, 455/414.1, 417, 11.1, 13.1, 550.1, 556.1, 455/560, 575.1, 575.6, 90.1
See application file for complete search history.

(56) References Cited

U.S. PATENT DOCUMENTS

| | | | | |
|---|---|---|---|---|
| 4,551,854 A | * | 11/1985 | Rutty et al. | 455/78 |
| 4,991,197 A | * | 2/1991 | Morris | 455/557 |
| 5,657,371 A | * | 8/1997 | Suomi et al. | 455/418 |
| 5,930,719 A | * | 7/1999 | Babitch et al. | 455/462 |
| 6,055,443 A | * | 4/2000 | Exner et al. | 455/560 |
| 7,170,863 B1 | | 1/2007 | Denman et al. | |
| 7,466,988 B2 | * | 12/2008 | Koskinen et al. | 455/456.3 |
| 2001/0021659 A1 | * | 9/2001 | Okamura | 455/557 |
| 2002/0109481 A1 | | 8/2002 | Waterman et al. | |
| 2003/0003876 A1 | | 1/2003 | Rumsey | |
| 2004/0151151 A1 | | 8/2004 | Kubler et al. | |
| 2004/0203510 A1 | * | 10/2004 | Claxton et al. | 455/90.3 |
| 2005/0288039 A1 | * | 12/2005 | Liou | 455/456.6 |
| 2007/0087777 A1 | * | 4/2007 | Shibuya et al. | 455/550.1 |
| 2008/0268792 A1 | * | 10/2008 | Munje | 455/90.2 |

OTHER PUBLICATIONS

International Search Report and Written Opinion of the International Searching Authority for Application No. PCT/US07/11065, dated Jun. 18, 2008.

* cited by examiner

*Primary Examiner* — Jean A Gelin
(74) *Attorney, Agent, or Firm* — Buchanan Ingersoll & Rooney PC

(57) ABSTRACT

A circuit for connecting radio frequency transceivers and cellular radio systems to a computer for improving the efficiency and distance of two-way radio communications devices. A device for connecting radio frequency transceivers and cellular radio systems to a computer for improving the efficiency and distance of two-way radio communications devices. A method for connecting radio frequency transceivers and cellular radio systems to a computer for improving the efficiency and distance of two-way radio communications devices.

9 Claims, 6 Drawing Sheets

SYSTEM FOR TRANSMITTING TWO-WAY RADIO COMMUNICATIONS VIA COMPUTER NETWORKS

FIELD

The invention pertains to the field of two-way radio communications devices and, more specifically, to the combining of radio frequency ('RF') transceivers, including cellular radio systems, with computer networks for improving the efficiency and distance of two-way radio communications.

BACKGROUND

There are numerous devices and methods for connecting radio frequency transceivers and cellular radio systems to computers. Among these devices are packet radio stations, packet node networks and Echolink networks.

A basic packet radio station consists of a computer, a modem and a transceiver with an antenna. Traditionally, the computer and modem are combined in one unit, referred to as a terminal node controller ('TNC'), with a dumb terminal or a computer software terminal emulator, and the combination is used to input and display data.

Advantageously, the TNC of a basic packet radio station works with a modem to convert American Standard Code for Information Interchange ('ASCII') codes typed by a user into modulated tones to be broadcast by the RF transceiver and convert demodulated tones received from other packet radio stations back to ASCII to be displayed on the terminal. Further advantageously, the computer formats the transmitted data in a standard AX.25 Internet data packet ('the data'), and controls the radio channel.

Disadvantageously, however, the basic packet radio station operates in a simplex mode and does not receive and transmit signals simultaneously. Further disadvantageously, the basic packet radio station requires a data parity acknowledgment from the destination station limiting the distance that the data can travel. Further disadvantageously, the AX.25 protocol used to transmit the data in the basic packet radio station is used to establish direct, point-to-point links between packet radio stations, and requires an expensive digipeater to establish communications between two stations unable to communicate directly.

A packet node network is another means of connecting to other packet stations by first connecting to a radio broadcast node or to a digipeater that is in contact with other radio broadcast nodes to communicate with a distant radio station.

Advantageously, the packet node network is very simple to use and can reach greater distances and is compatible with basic packet radio. Further advantageously, each radio broadcast node that the data is routed through acknowledges the data packet as it is sent to the destination station.

Disadvantageously, however, the packet node requires the operator to first directly connect to a local radio broadcast node or local digipeater with good signal strength. Then the operator connects to a first station within range of the radio broadcast node. Next, the first station connects to a non-local radio broadcast node within the first station's communication range. Then the non-local radio broadcast node transmits the typed message to a connected bulletin board system ('BBS'). The user can also obtain a list of the non-local radio broadcast nodes that are available, check routes of communications between the user and a destination radio broadcast node that is to be contacted and check the status of the user in relation to the local radio broadcast nodes and the non-local radio broadcast nodes. Further disadvantageously, each radio broadcast node must continuously update and broadcast a list of other radio broadcast nodes that can be contacted, thereby diminishing the available bandwidth for radio traffic.

An Echolink network provides a means for worldwide connections to be made between radio stations or from a computer to a radio station that greatly enhances the radio's communications capability.

Advantageously, the Echolink network program provides a method for radio stations to communicate with one another over the Internet, using voice-over-Internet Protocol ('VoIP') technology.

Disadvantageously, however, the Echolink network only provides a simplex link or one way communication (i.e., the radio station can transmit radio signals or receive radio signals but not simultaneously). Further disadvantageously, a very high frequency ('VHF') or an ultra high frequency ('UHF') transceiver must be in range of their station or near a repeater station to communicate with other stations and the receiving station must be similarly-equipped to receive the voice communication.

Therefore, there exists a need for connecting RF transceivers and cellular radio systems to a computer for improving the efficiency and distance of two-way radio communications devices that is not associated with these disadvantages.

BRIEF DESCRIPTION OF THE DRAWINGS

These and other features, aspects and advantages of the present invention will become better understood with regard to the following description, appended claims, and accompanying figures where:

DETAILED DESCRIPTION

According to one embodiment of the present invention, there is provided a circuit for connecting RF transceivers and cellular radio systems to a computer for improving the efficiency and distance of two-way radio communications devices. According to another embodiment of the present invention, there is provided a device for connecting RF transceivers and cellular radio systems to a computer for improving the efficiency and distance of two-way radio communications devices. In one embodiment, the device comprises a circuit according to the present invention. According to another embodiment of the present invention, there is provided a method for connecting RF transceivers and cellular radio systems to a computer for improving the efficiency and distance of two-way radio communications devices. In one embodiment, the method comprises providing a device according to the present invention. The circuit, device and method will now be disclosed in detail.

Figure 1:
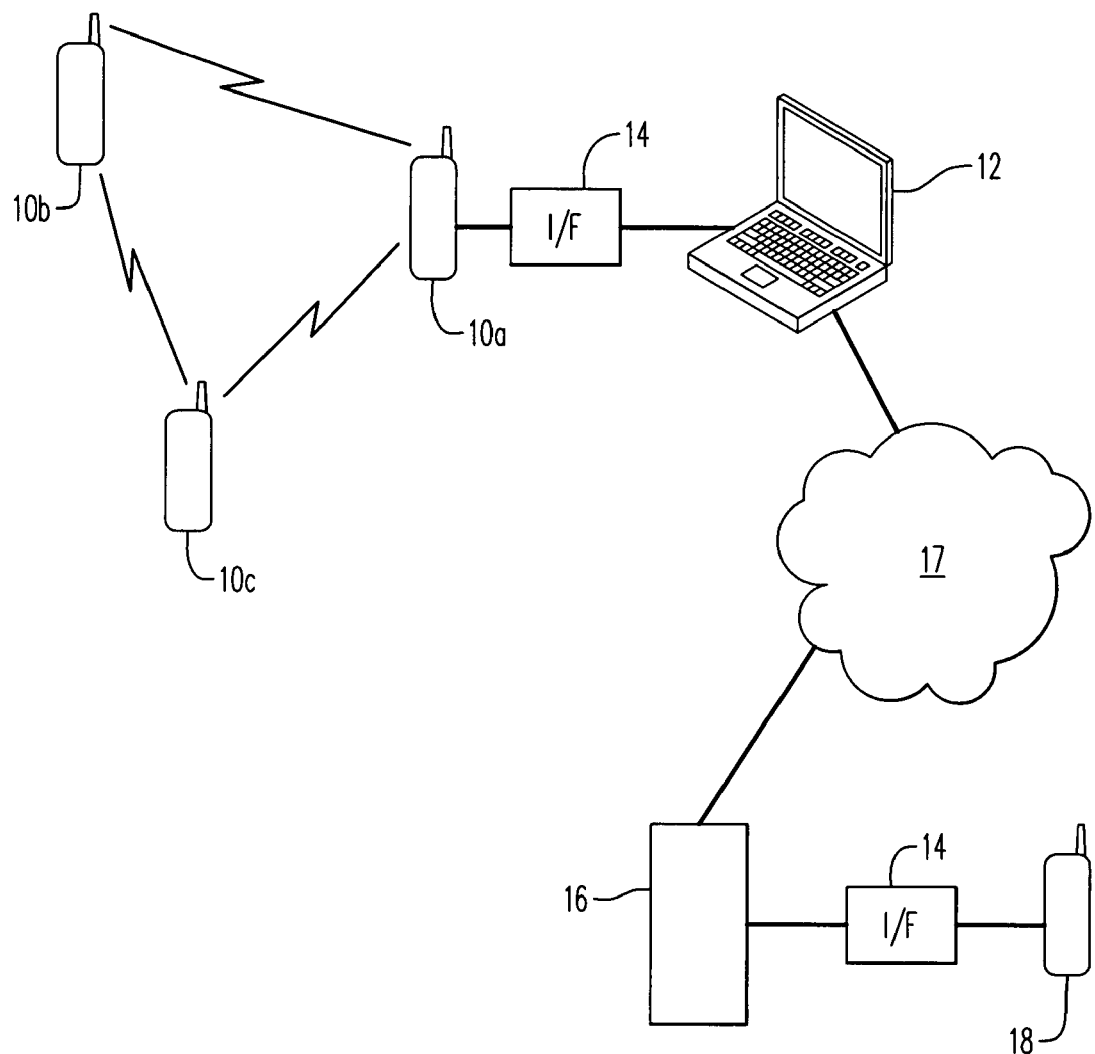
FIG. 1 is a block diagram of a basic arrangement for combining a radio-frequency transceiver with a computer communications network.

A schematic illustration of a basic system incorporating the principles of the present invention is shown in FIG. 1. A radio frequency (RF) transceiver 10a normally operates to communicate with other RF transceivers 10b, 10c, etc., via a predetermined channel, or frequency baud. Only those transceivers which are tuned to the predetermined channel can communicate with one another. In the implementation of the invention, the transceivers could be two-way radios, cellular radiotelephones (including base stations), and any other devices capable of duplex radio frequency communications.

In the embodiment illustrated in FIG. 1, the transceiver 10a is connected to a computer 12 by means of an interface device 14. By way of example, the computer 12 can be a laptop computer, desktop computer or server. When the transceiver is in the transmit mode, the interface device 14 inputs audio signals generated by the transceiver to the computer. Conversely, in the receive mode, audio signals produced by the computer are forwarded to the transceiver 10a, via the interface device 14.

When the computer receives an audio signal from the transceiver, it converts the audio information into one or more audio data packets. These audio data packets can be transmitted to another computer 16 via any suitable communications network 17, e.g. a local area network, a wide-area network, the Internet, etc. At the receiving computer 16, the audio data packets are converted to analog audio signals, where they are reproduced via speakers which may be internal components of the computer 16, or externally connected thereto. Alternatively, the receiving computer 16 can be connected to another transceiver 18 via an interface device 14. In this case, the audio signal is reproduced at the transceiver 18.

The ability to communicate over a two-way transceiver by means of a computer network offers a number of advantages. First, the geographic range of the transceiver is no longer limited. Using computers that are connected to the Internet, for example, two-way radios located anywhere in the world can communicate with one another. Second, the radios need not be compatible with one another. By communicating over the computer network, for example, by means of an IP protocol, the system becomes frequency agnostic. As a result, radios on distinctly different communications channels are able to send and receive audio signals to and from one another.

A third advantage resides in the fact that an enterprise can continue to use its legacy equipment to achieve this expanded communications ability. In other words, the transceivers and computers can be standard devices that are already being used by the enterprise. The only non-standard component is the interface which connects them together. This component will now be described in greater detail.

Figure 2:
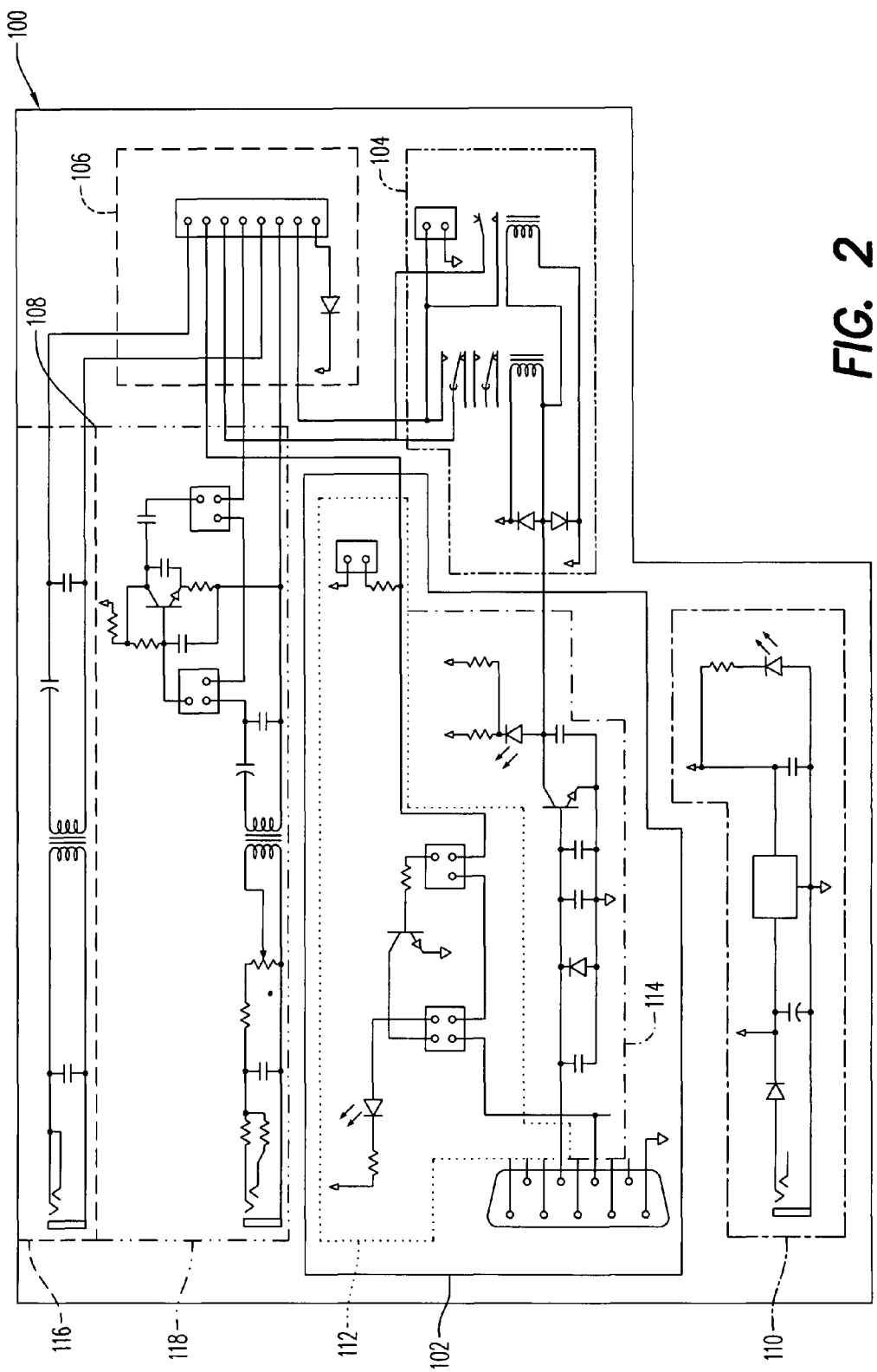
FIG. 2 is a schematic diagram of a circuit for connecting radio frequency transceivers and cellular radio systems to a computer for improving the efficiency and distance of two-way radio communications devices according to one embodiment of the present invention.

Referring to FIG. 2, there is shown a schematic diagram of an interface circuit for connecting RF transceivers and cellular radio systems to a computer for improving the efficiency and distance of two-way radio communications devices according to one embodiment of the present invention. As can be seen, the circuit comprises a serial interface assembly 102, a switching assembly 104, a radio interface assembly 106, a sound card interface assembly 108 and a power supply assembly 110. The serial interface assembly 102 is electrically connected to the switching assembly 104, the switching assembly 104 is electrically connected to the radio interface assembly 106, the radio interface assembly 106 is electrically connected to the sound card interface assembly 108, and the power supply assembly 110 is electrically connected to the switching assembly 104.

In one embodiment, the interface circuit is attached to a serial interface on a computer, such as a USB port (not shown), through the serial interface assembly 102. The sound card interface assembly 108 is also attached to the computer, e.g. 12, and a radio or cellular radio, e.g. 10a, is attached to the radio interface assembly. In one embodiment, the user speaks through a microphone (not shown) that is attached to the computer and the speech is sent from the computer through the interface circuit to the radio or cellular radio and transmitted. Inbound messages to the radio can be simultaneously received by the radio and sent to a speaker (not shown) attached to the computer through the interface circuit.

In one embodiment shown in FIG. 2, the serial interface assembly 102 comprises a push to talk ('PTT') sub-assembly 112 and a communication reception ('COR') sub-assembly 114. In this embodiment, the PTT sub-assembly 112 comprises filtering circuitry to regulate a voltage of +5VDC that is received via pin 7 of the serial interface assembly 102. This voltage signal might be generated, for instance, when the user presses the space bar on the keyboard of the computer. In a preferred embodiment, the PTT sub-assembly comprises the filtering circuitry and a red light-emitting diode ('LED') to indicate voltage is present in the PTT sub-assembly, to indicate that the transceiver has been placed in the transmit mode.

In one embodiment, the COR sub-assembly 114 comprises jumpers Ju1, JU2, JU5 and transistor Q2. The jumpers Ju1, JU2 and JU5 provide manual adjustments to a voltage of +5VDC in the COR sub-assembly to compensate for various models of radios. In a preferred embodiment, the COR sub-assembly 114 further comprises a yellow LED to indicate that voltage is present in the COR sub-assembly 114, i.e. the transceiver is in a receive mode. In a particularly preferred embodiment, the jumpers JU1, JU2 and JU5 are automatically configured.

In one embodiment, the switching assembly 104 comprises a power connection D7 and D7A, to connect the power supply assembly 110 to the circuit 100, and a Reed type relay SP RLY for changing a switch state and a jumper JU6 for adjusting a voltage applied to the switch relay RLY. In a preferred embodiment, the switch relay RLY is a single pole single throw style relay in the normally closed position ('NC'), as will be understood by those with skill in the art with reference to this disclosure. In a particularly preferred embodiment, the switch relay RLY is a double pole double throw style relay for attaching further devices to the circuit 100 as will be understood by those with skill in the art with reference to this disclosure. When a +5VDC signal is received from the PTT sub-assembly 112, the Reed relay SP RLY is activated and a +12VDC voltage is applied to the switch relay RLY and the +12VDC signal is sent to the radio interface assembly 106 to activate the transmit function of the radio or cellular radio.

In one embodiment, the radio interface assembly 106 attaches the circuit 100 to the radio or cellular radio wherein the pinouts of the interface are as follows: a) pin 1 corresponds to a receive audio signal of the radio or cellular radio; b) pin 2 corresponds to a COR signal of the radio or cellular radio; c) pin 3 corresponds to a PTT signal of the radio or cellular radio; d) pin 4 corresponds to a transmit audio signal of the radio or cellular radio; e) pin 5 corresponds to a receive audio low signal of the radio or cellular radio; f) pin 6 corresponds to a transmit audio low signal of the radio or cellular radio; g) pin 7 corresponds to a PTT low signal of the radio or cellular radio; and h) pin 8 corresponds to a +12VDC voltage of the radio or cellular radio.

In one embodiment, the sound card interface assembly 108 comprises a receive audio line sub-assembly 116 and a transmit audio line sub-assembly 118. In a preferred embodiment, the receive audio line sub-assembly 116 comprises circuitry to attach to a microphone or a line-in jack of a computer sound card for sending audio signals to the computer from the radio interface assembly 106. In one embodiment, the transmit audio line sub-assembly 118 comprises circuitry to attach the interface circuit to a speaker or to a speaker-out jack of a computer sound card to receive audio from the computer and provide it to the radio interface assembly 106. In a preferred embodiment, there is provided a potentiometer R3 to adjust the volume of the audio received at the transceiver from the radio interface assembly 106. In a particularly preferred embodiment, the transmit audio line sub-assembly 118 further comprises jumpers JU3 and JU4 and circuitry to adjust the voltage of the volume signal received at the transceiver from the radio interface assembly 106 for various models of radios and cellular radios.

In one embodiment, the power supply assembly 110 comprises a voltage regulator integrated circuit ('IC') U1 to provide a consistent +12VDC to the interface circuit. In a preferred embodiment, the interface circuit can draw power from the radio interface assembly 106 +12VDC pin 8. In a further preferred embodiment, the interface circuit can draw power from the computer.

As will be appreciated by those with skill in the art, the present invention allows for the simultaneous transmission and reception of radio and cellular radio signals using any packet switched or Internet enabled device.

According to the present invention, there is provided a method for connecting radio frequency transceivers and cellular radio systems to a computer for improving the efficiency and distance of two-way radio communications devices. In one embodiment, the method comprises, first providing a device for connecting radio frequency transceivers and cellular radio systems to a computer for improving the efficiency and distance of two-way radio communications devices. Then, the device is connected to a serial port of a computer. Next, the device is connected to a radio or cellular radio. Then, power is supplied to the device. Next, a user starts communication software on the computer. Then, the user attaches a microphone to the computer. Next, the user attaches a speaker to the computer. Then, user selects the person to contact in the software, i.e. the network address of the destination computer for the audio packets. Next, if contact with the selected person is made, the user speaks through the microphone and listens through the speaker to the selected person simultaneously.

Figure 3A:
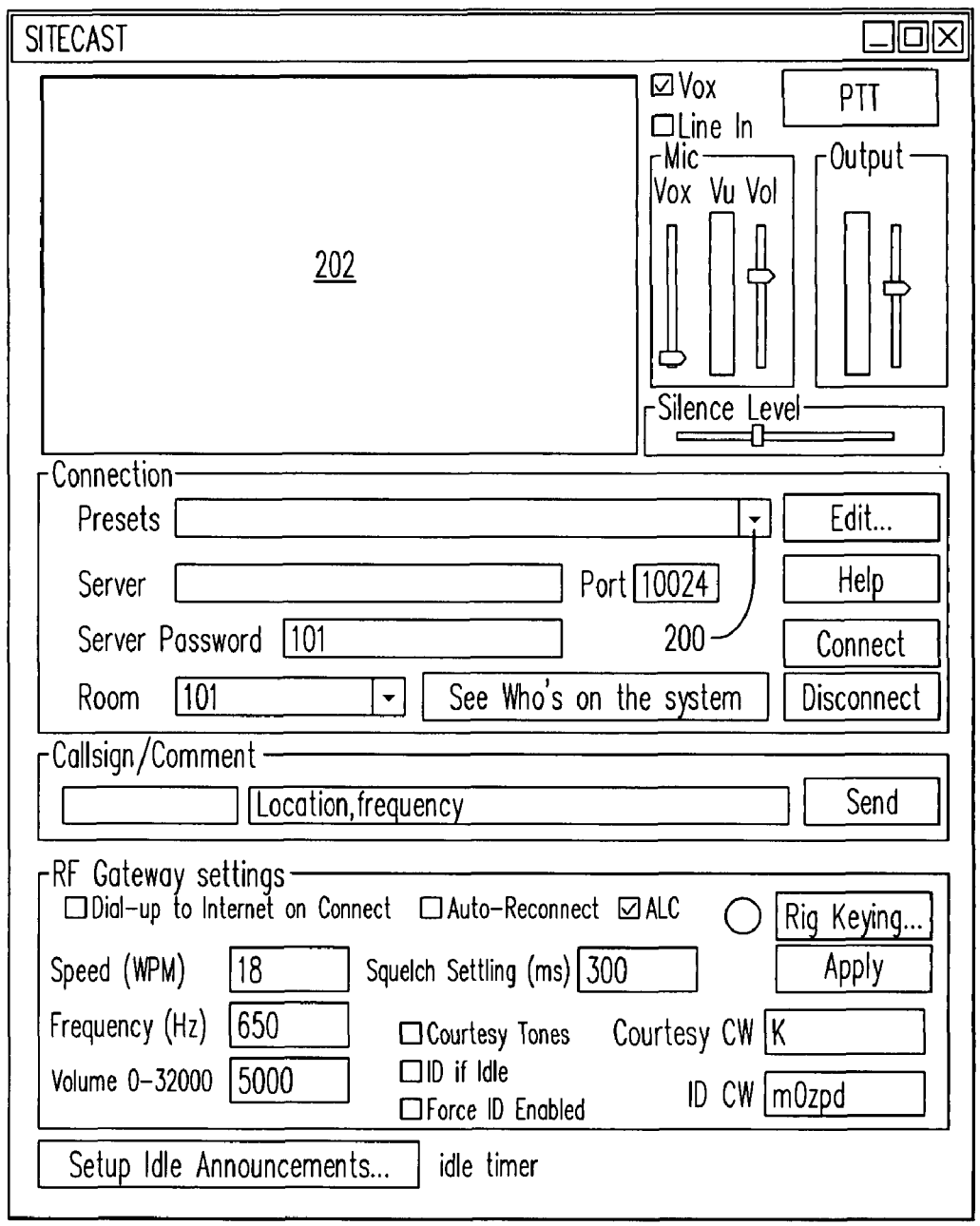
FIGS. 3A and 3B illustrate examples of user interfaces for the client software component of the system.
Figure 3B:
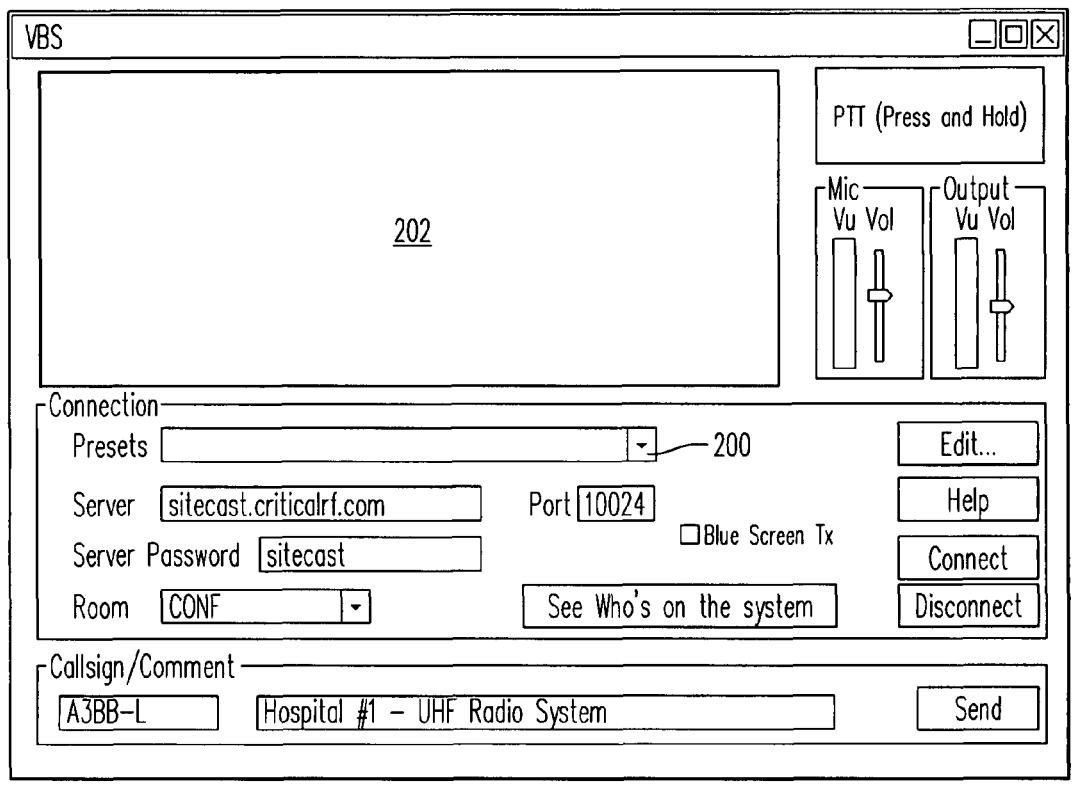

Examples of user interfaces for the software are illustrated in FIGS. 3A and 3B. The example of FIG. 3A might be used for a configuration such as that depicted in FIG. 1, and the example of FIG. 3B can be used for a virtual base station, i.e. to connect to a cellular telephone network. The user interface provides simple, real-time switching between workgroups and radio systems. By pressing a button 200, a drop down menu of available networks (not shown) is presented to the user. From this menu, the user can select a sub-group of radios with which to communicate. In effect, this selection identifies the IP address of the server, or other computer, which is connected to that sub-group, and determines the destination for the audio packets. Once a session is established, the identity of the parties who are currently active on that sub-group can be displayed in a window 202. In essence, therefore, the software functions as IP subsystem, i.e. a network of radio subnetworks.

The present invention provides a means for radio frequency transceivers and cellular radio systems users to speak to other radio system users in a native environment. For example, a two-way radio user in a logging forest can speak to an operations supervisor located in a distant factory by using a notebook computer with the interface circuit attached thereto.

In one embodiment, there is provided a circuit and a method for remote control of an RF transceiver through a serial communications port on a computer.

Figure 4A:
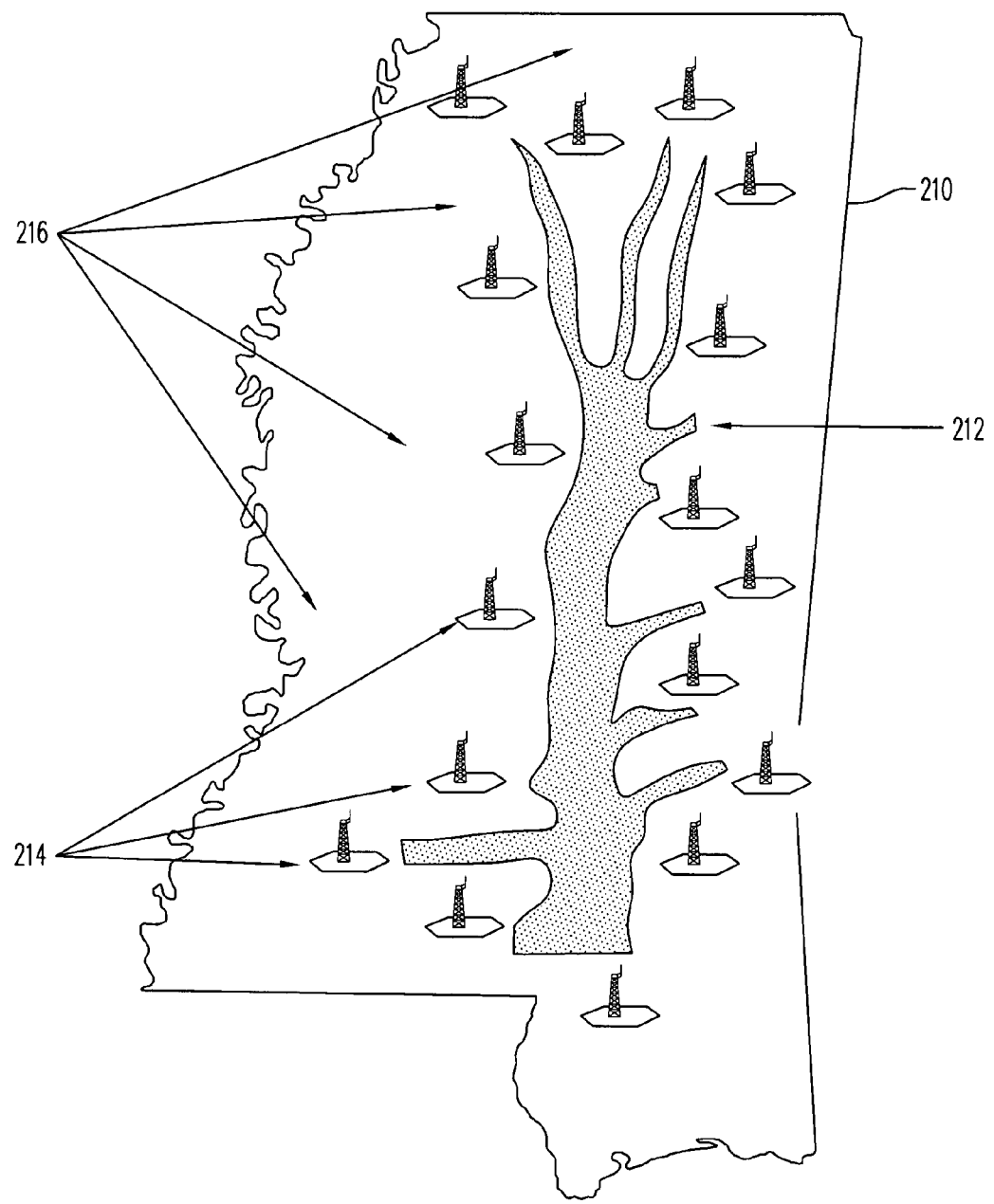
FIGS. 4A and 4B illustrate an example of an application of the invention to an existing trunked radio network.
Figure 4B:
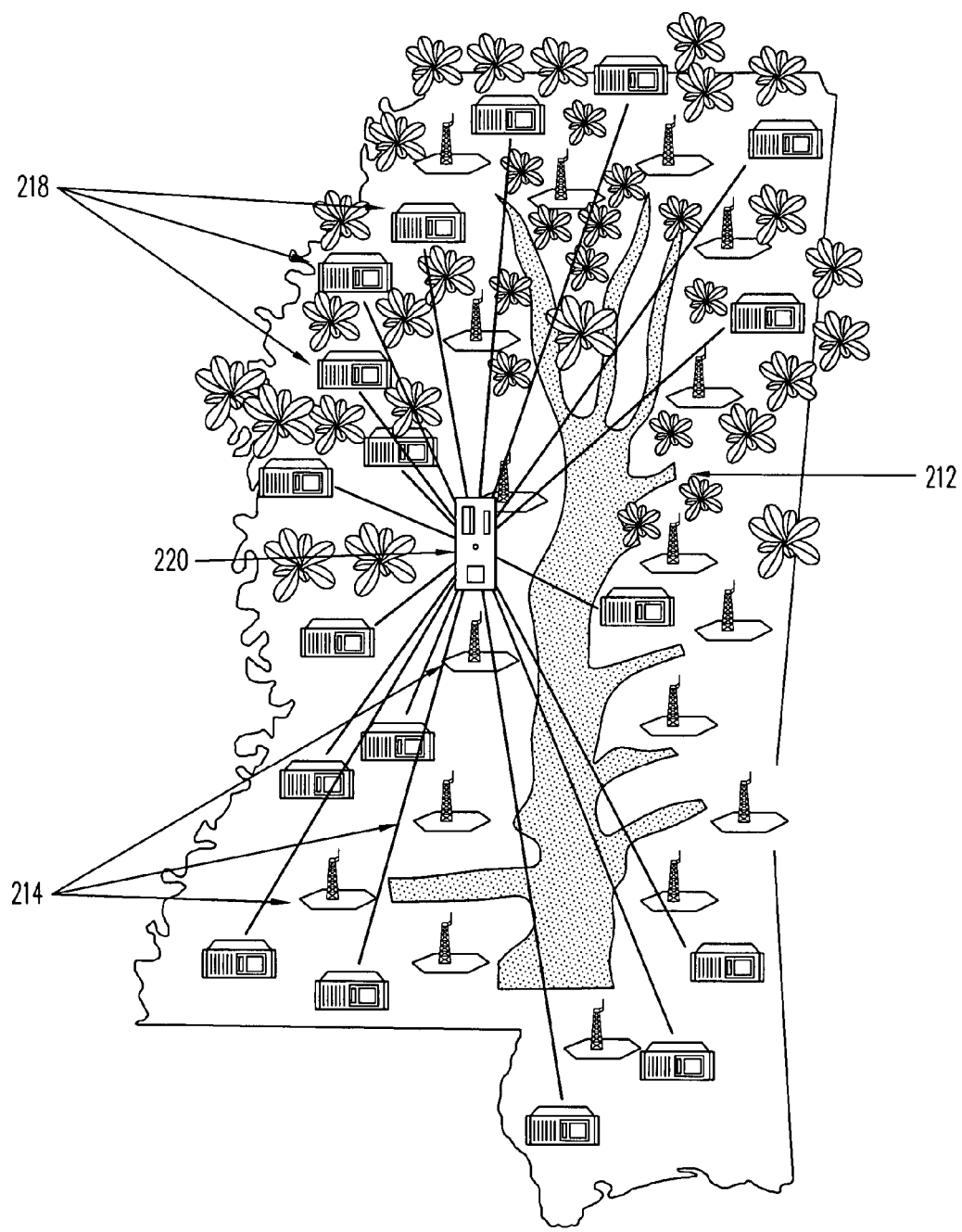

FIGS. 4A and 4B illustrate an example of the manner in which the present invention can be implemented to enhance communication capabilities. FIG. 4A depicts a geographic region 210, e.g. a state, having a trunked radio network 212. The various base stations 214 represent radio system coverage along major highways, major cities, and other areas of higher population density. As depicted by the arrows 216, however, there are significant areas within the geographic region that cannot communicate with the trunked radio network.

FIG. 4B illustrates the result of incorporating the features of the present invention into the trunked radio network 212. A computer 218 at each of the local jurisdictions is connected to a transceiver that is turned to the frequency of the two-way radio system for that jurisdiction. Each such computer has an IP connection that enables it to communicate with a secure conference server 220. This server functions as a directory that enables any one of the local agencies talk to any other agency within the entire geographic area via two-way radios.

In another embodiment, there is provided a more efficient method of combining the control elements of a TNC that implements the AX.25 protocol and provides a command line interface to the user, and simultaneously compressing and decompressing packet data that is transmitted ('TX') or received ('RX') at increased rates because of the pervasive nature of broadband Internet packet data connections.

In another embodiment, there is provided instructions operable on a computer system that interconnect radio frequency repeater stations together on a private network that is not accessible by other stations on the public EchoLink network.

In another embodiment, the present invention can be used to communicate between different radio frequency bandwidths, also known as "Interoperability," as will be understood by those with skill in the art, with reference to this disclosure. A standardized TCP/IP connection is provided at each relay point or midpoint of the transmission and is backhauled to the frequency band or proprietary "trunking" format scheme for sharing a small block of RF channels. The transmission is therefore agnostic to the frequency.

In another embodiment, any packet switched or Internet enabled device with the present invention attached to a serial port and to a sound card, such as for example, a personal digital assistant ('PDA'), a notebook, a desktop computer and packet data enabled cellular phone, can communicate with radio users.

Although the present invention has been discussed with reference to certain preferred embodiments, other embodiments are possible. Therefore, the scope of the appended claims should not be limited to the description of preferred embodiments contained in this disclosure. All references cited herein are incorporated by reference in their entirety.

What is claimed is:

1. A circuit for connecting a radio frequency transceiver to a computer, comprising
   a first interface for connection to transmit, receive and control terminals of a radio frequency transceiver;
   a second interface connected to said first interface for connecting a transmit terminal of the radio frequency transceiver to an audio output terminal of a computer, and connecting a receive terminal of the radio frequency transceiver to an audio input terminal of the computer;
   a third interface connected to said first interface for connecting a control terminal of the radio frequency transceiver to a serial port of the computer; and
   a switching circuit for selectively providing a voltage signal to said control terminal of said radio frequency transceiver to, when said third interface receives a control signal from said serial port of the computer, activate and control said transmit terminal of said radio frequency transceiver to transmit an audio signal received from said computer to at least one other radio frequency transceiver.

2. The circuit of claim 1, wherein the third interface circuit is configured to cause said control terminal of said radio frequency transceiver to control said transmit terminal of said radio frequency transceiver to transmit the audio signal received from said computer as a COR signal.

3. The circuit of claim 1, wherein said third interface includes a filter circuit for regulating the voltage of said signal.

4. The circuit of claim 1, wherein said third interface includes an indicator that is connected to a communications reception terminal of the radio frequency transceiver via said first interface.

5. A two-way radio communication system, comprising:
 a radio frequency transceiver capable of two-way radio frequency communications with other radio frequency transceivers, said radio frequency transceiver having a control terminal, a receive terminal and a transmit terminal;
 a computer connected to a computer network for communication with other computers on said network; and
 an interface circuit connecting said radio frequency transceiver to said computer to exchange audio signals between said radio frequency transceiver and said computer, and to selectively provide a voltage signal to said control terminal of said radio frequency transceiver to, when said interface circuit receives an audio signal from said computer, activate and control said transmit terminal of said radio frequency transceiver to transmit the audio signal received from said computer to at least one of the other radio frequency transceivers.

6. The communication system of claim 5, wherein said computer converts said audio signals into audio data packets for communication over said network.

7. The communications system of claim 6, wherein said computer communicates over said network by means of an IP protocol.

8. The communications system of claim 6, wherein said interface circuit comprises:
 a first interface for connection to said transmit, receive and control terminals of said radio frequency transceiver;
 a second interface connected to said first interface for connecting said transmit terminal of the radio frequency transceiver to an audio output terminal of said computer and connecting said receive terminal of the radio frequency transceiver to an audio input terminal of the computer; and
 a third interface connected to said first interface for connecting said control terminal of the radio frequency transceiver to a serial port of the computer.

9. The communication system of claim 6, wherein the interface circuit is configured to cause said control terminal of said radio frequency transceiver to control said transmit terminal of said radio frequency transceiver to transmit the audio signal received from said computer as a COR signal.

* * * * *